(12) United States Patent
Jons et al.

(10) Patent No.: US 9,186,604 B1
(45) Date of Patent: Nov. 17, 2015

(54) HYDROCLONE WITH VORTEX FLOW BARRIER

(71) Applicant: Dow Global Technologies LLC, Midland, MI (US)

(72) Inventors: Steven D. Jons, Eden Prairie, MN (US); Santhosh K. Ramalingam, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/390,513

(22) PCT Filed: May 22, 2013

(86) PCT No.: PCT/US2013/042127
§ 371 (c)(1),
(2) Date: Oct. 3, 2014

(87) PCT Pub. No.: WO2013/181028
PCT Pub. Date: Dec. 5, 2013

Related U.S. Application Data

(60) Provisional application No. 61/653,788, filed on May 31, 2012.

(51) Int. Cl.
*B01D 21/26* (2006.01)
*B01D 36/00* (2006.01)
(Continued)

(52) U.S. Cl.
CPC .......... *B01D 21/267* (2013.01); *B01D 21/0012* (2013.01); *B01D 21/2411* (2013.01); *B01D 36/00* (2013.01)

(58) Field of Classification Search
CPC .. B01D 21/267; B01D 36/00; B01D 21/0012; B01D 21/2411
See application file for complete search history.

(56) References Cited

U.S. PATENT DOCUMENTS 431,448 A    7/1890   Dixon
1,107,485 A  8/1914   Bowser
(Continued)

FOREIGN PATENT DOCUMENTS

DE    4420760    5/1995
DE    19914674   12/2000
(Continued)

OTHER PUBLICATIONS

The Chapter II International Report on Patentability for PCT/US2013/04217, dated Sep. 9, 2014.*
(Continued)

*Primary Examiner* — David A Reifsnyder
(74) *Attorney, Agent, or Firm* — Edward W. Black

(57) ABSTRACT

A hydroclone (10) including a tank (12) having a fluid inlet (14), a filtered fluid outlet (16), an effluent outlet (18), a process fluid outlet (20) and an inner peripheral wall (22) positioned about an axis (X) and enclosing a plurality of aligned chambers including: i) a vortex chamber (24) in fluid communication with the fluid inlet (14), a filter assembly (26) located within the vortex chamber (24) and enclosing a filtrate chamber (46), a fluid pathway (28) extending from the fluid inlet (14) and about the filter assembly (26) which is adapted to generate a vortex fluid flow about the filter assembly (26), wherein the filtrate chamber (46) is in fluid communication with the filtered fluid outlet (16) such that fluid passing through the filter assembly (26) enters the filtrate chamber (46) and may exit the tank (12) by way of the filtered fluid outlet (16), and ii) an effluent separation chamber (30) in fluid communication with the vortex chamber (24) and which is adapted for receiving unfiltered fluid therefrom, wherein the effluent separation chamber (30) is in fluid communication with the process fluid outlet (20) and an effluent outlet (18); wherein the hydroclone (10) further includes a vortex flow barrier (34) located between the vortex and effluent separation chambers (24, 30) which is adapted to disrupts vortex fluid flow as fluid flows from the vortex chamber (24) to the effluent separation chamber (30).

6 Claims, 6 Drawing Sheets

(51) Int. Cl.
*B01D 21/24* (2006.01)
*B01D 21/00* (2006.01)

(56) References Cited

U.S. PATENT DOCUMENTS

| | | | |
|---|---|---|---|
| 1,919,653 | A | 7/1933 | Hill |
| 2,706,045 | A | 4/1955 | Large |
| 2,788,087 | A | 4/1957 | Lenehan |
| 2,917,173 | A | 12/1959 | Rakowsky |
| 3,061,098 | A | 10/1962 | Brezinski |
| 3,219,186 | A | 11/1965 | Polhemus et al. |
| 3,285,422 | A | 11/1966 | Wiley |
| 3,529,544 | A | 9/1970 | Oki |
| 3,529,724 | A | 9/1970 | Maciula et al. |
| 3,822,533 | A | 7/1974 | Oranje |
| 3,893,914 | A | 7/1975 | Bobo |
| 3,947,364 | A | 3/1976 | Laval, Jr. |
| 4,062,766 | A | 12/1977 | Duesling |
| 4,120,783 | A | 10/1978 | Baummer |
| 4,146,468 | A | 3/1979 | Wilson |
| 4,159,073 | A | 6/1979 | Liller |
| 4,178,258 | A | 12/1979 | Papay et al. |
| 4,216,095 | A | 8/1980 | Ruff |
| 4,298,465 | A | 11/1981 | Druffel |
| 4,414,112 | A | 11/1983 | Simpson et al. |
| 4,575,406 | A | 3/1986 | Slafer |
| 4,596,586 | A | 6/1986 | Davies et al. |
| 4,608,169 | A | 8/1986 | Arvanitakis |
| 4,651,540 | A | 3/1987 | Morse |
| 4,662,909 | A | 5/1987 | Durr |
| 4,698,156 | A | 10/1987 | Bumpers |
| 4,865,751 | A | 9/1989 | Smisson |
| 4,931,180 | A | 6/1990 | Darchambeau |
| 5,104,520 | A | 4/1992 | Maronde et al. |
| 5,116,516 | A | 5/1992 | Smisson |
| 5,188,238 | A | 2/1993 | Smisson et al. |
| 5,227,061 | A | 7/1993 | Bedsole |
| 5,277,705 | A | 1/1994 | Anderson et al. |
| 5,407,584 | A | 4/1995 | Broussard, Sr. |
| 5,466,384 | A | 11/1995 | Prevost et al. |
| 5,478,484 | A | 12/1995 | Michaluk |
| 5,593,043 | A | 1/1997 | Ozmerih |
| 5,879,545 | A | 3/1999 | Antoun |
| 5,972,215 | A | 10/1999 | Kammel |
| 6,110,242 | A | 8/2000 | Young |
| 6,117,340 | A | 9/2000 | Carstens |
| 6,210,457 | B1 | 4/2001 | Siemers |
| 6,238,579 | B1 | 5/2001 | Paxton et al. |
| 6,251,296 | B1 | 6/2001 | Conrad et al. |
| 6,511,599 | B2 | 1/2003 | Jaroszczyk et al. |
| 6,531,066 | B1 | 3/2003 | Saunders et al. |
| 6,613,231 | B1 | 9/2003 | Jitariouk |
| 6,790,346 | B2 | 9/2004 | Caleffi |
| 6,896,720 | B1 | 5/2005 | Arnold et al. |
| 7,166,230 | B2 | 1/2007 | Nilsen et al. |
| 7,316,067 | B2 | 1/2008 | Blakey |
| 7,351,269 | B2 | 4/2008 | Yau |
| 7,632,416 | B2 | 12/2009 | Levitt |
| 7,651,000 | B2 | 1/2010 | Knol |
| 7,785,479 | B1 | 8/2010 | Hosford |
| 7,854,779 | B2 | 12/2010 | Oh |
| 7,896,169 | B2 | 3/2011 | Levitt et al. |
| 7,998,251 | B2 | 8/2011 | Pondelick et al. |
| 8,201,697 | B2 | 6/2012 | Levitt et al. |
| 8,663,472 | B1 | 3/2014 | Mallard et al. |
| 8,701,896 | B2 | 4/2014 | Levitt et al. |
| 2003/0029790 | A1 | 2/2003 | Templeton |
| 2003/0221996 | A1 | 12/2003 | Svoronos et al. |
| 2004/0211734 | A1 | 10/2004 | Moya |
| 2005/0109684 | A1 | 5/2005 | DiBella et al. |
| 2007/0039900 | A1 | 2/2007 | Levitt |
| 2007/0075001 | A1 | 4/2007 | Knol |
| 2007/0187328 | A1 | 8/2007 | Gordon |
| 2010/0044309 | A1 | 2/2010 | Lee |
| 2010/0083832 | A1 | 4/2010 | Pondelick et al. |
| 2010/0096310 | A1 | 4/2010 | Yoshida |
| 2011/0120959 | A1 | 5/2011 | Levitt et al. |
| 2011/0160087 | A1 | 6/2011 | Zhao et al. |
| 2011/0220586 | A1 | 9/2011 | Levitt |
| 2012/0010063 | A1 | 1/2012 | Levitt et al. |
| 2012/0145609 | A1 | 6/2012 | Caffell et al. |
| 2013/0126421 | A1 | 5/2013 | Levitt et al. |

FOREIGN PATENT DOCUMENTS

| | | |
|---|---|---|
| DE | 10001737 | 10/2001 |
| DE | 102005027509 | 12/2006 |
| EP | 0375671 | 6/1990 |
| EP | 0475252 | 3/1992 |
| EP | 0380817 | 1/1993 |
| EP | 0566792 | 10/1993 |
| EP | 2082793 | 7/2009 |
| FR | 2791904 | 10/2000 |
| GB | 2007118 | 5/1979 |
| GB | 2309182 | 7/1997 |
| GB | 2423264 | 8/2006 |
| KR | 2004105165 | 12/2004 |
| KR | 899416 | 5/2009 |
| WO | 0218056 | 3/2002 |
| WO | 03026832 | 4/2003 |
| WO | 2004064978 | 8/2004 |
| WO | 2011160087 | 12/2011 |
| WO | 2012154448 | 11/2012 |
| WO | 2013181028 | 12/2013 |
| WO | 2013181029 | 12/2013 |

OTHER PUBLICATIONS

The Chapter II International Report on Patentability (IPEA/409) for PCT/US2013/042127, dated Sep. 16, 2014.*
DOW Water & Process Solutions, G. Onifer, Oct. 2010, Executive Summary: Clean Filtration Technologies, Inc Turboclone Filter.
Clean Filtration Technologies, Inc. CFT Turboclone Demo System, 2010.
Clean Filtration Technologies, Inc. CFT Turboclone TC-201 Technical Datasheet, 2010.

* cited by examiner

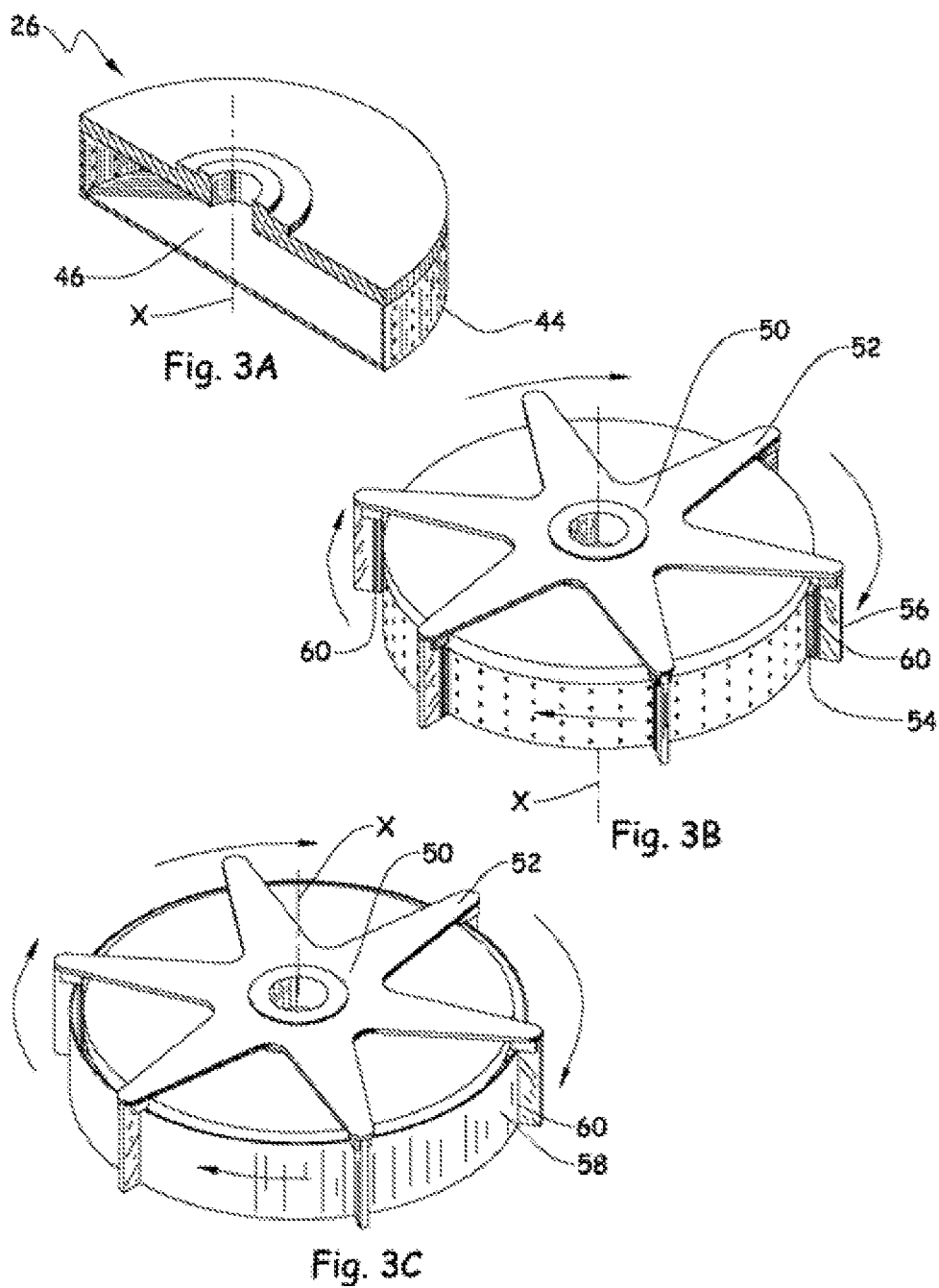

HYDROCLONE WITH VORTEX FLOW BARRIER

TECHNICAL FIELD

The invention is generally directed toward hydroclones and cyclonic separation of fluids.

BACKGROUND

Hydroclones are commonly used to separate suspended particles from liquids. In a typical embodiment, pressurized feed liquid (e.g. waste water) is introduced into a conically shaped chamber under conditions that create a vortex within the chamber. Feed liquid is introduced near the top of a conical chamber and an effluent stream is discharged near the bottom of the chamber. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Examples of hydroclones are described in: U.S. Pat. No. 3,061,098, U.S. Pat. No. 3,529,724, U.S. Pat. No. 5,104,520, U.S. Pat. No. 5,407,584 and U.S. Pat. No. 5,478,484. Separation efficiency can be improved by including a filter within the chamber such that a portion of the liquid moving to the center of the chamber passes through the filter. In such embodiments, cyclonic separation is combined with cross-flow filtration. Examples of such embodiments are described in: U.S. Pat. No. 7,632,416, U.S. Pat. No. 7,896,169, US2011/0120959 and US2012/0010063. While such hybrid designs improve separation efficiency, further improvements are desired.

SUMMARY

The invention includes multiple embodiments of hydroclones, separation systems including hydroclones and methods for performing fluid separations using the same. In one embodiment, the invention includes a hydroclone including a tank having a fluid inlet, a filtered fluid outlet, an effluent outlet, a process fluid outlet and an inner peripheral wall centered about an axis and enclosing a plurality of aligned chambers including: i) a vortex chamber in fluid communication with the fluid inlet, and ii) an effluent separation chamber in fluid communication with the vortex chamber and which is adapted for receiving unfiltered fluid therefrom, wherein the effluent separation chamber is in fluid communication with the process fluid outlet and an effluent outlet. The hydroclone further includes a vortex flow barrier located between the vortex chamber and effluent separation chamber which is adapted to maintain vortex fluid flow in the vortex chamber, disrupt the vortex as fluid flows between chambers and allow a reduced rotational velocity fluid flow within the effluent separation chamber. A filter assembly is located within the vortex chamber and encloses a filtrate chamber. A fluid treatment pathway extends from the fluid inlet and about the filter assembly and is adapted to generate a vortex fluid flow about the filter assembly. The filtrate chamber is in fluid communication with the filtered fluid outlet such that fluid passing through the filter assembly may enter the filtrate chamber and may exit the tank by way of the filtered fluid outlet.

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

FIG. 3A is a perspective, partially cut-away view of a filter assembly.

FIG. 3B is a perspective view of the filter of FIG. 2A including a cleaning assembly.

FIG. 3C is a perspective view of the assembly of FIG. 2B including an inlet flow shield.

DETAILED DESCRIPTION

The present invention generally relates to the hydroclone filtration devices and related methods of conducting cyclonic separation. For purposes of the present description, the term "hydroclone" refers to a filtration device that at least partially relies upon centrifugal forces generated by vortex fluid flow to separate constituents from a fluid mixture. Examples include the separation of solid particles from a liquid mixture (e.g. aqueous mixtures) and separation of mixtures including liquids of differing densities (e.g. oil and water). In one embodiment, the invention combines cyclonic separation, cross-flow filtration and particulate settling (e.g. sedimentation or flocculation) within a recirculation loop as part of a separation system. As used herein, the term "system" refers to an interconnected assembly of components. The invention finds utility in a variety of applications including the treatment of: pulp effluent generating by paper mills, process water generated by oil and gas recovery, bilge water, and municipal and industrial waste water.

Figure 1A:
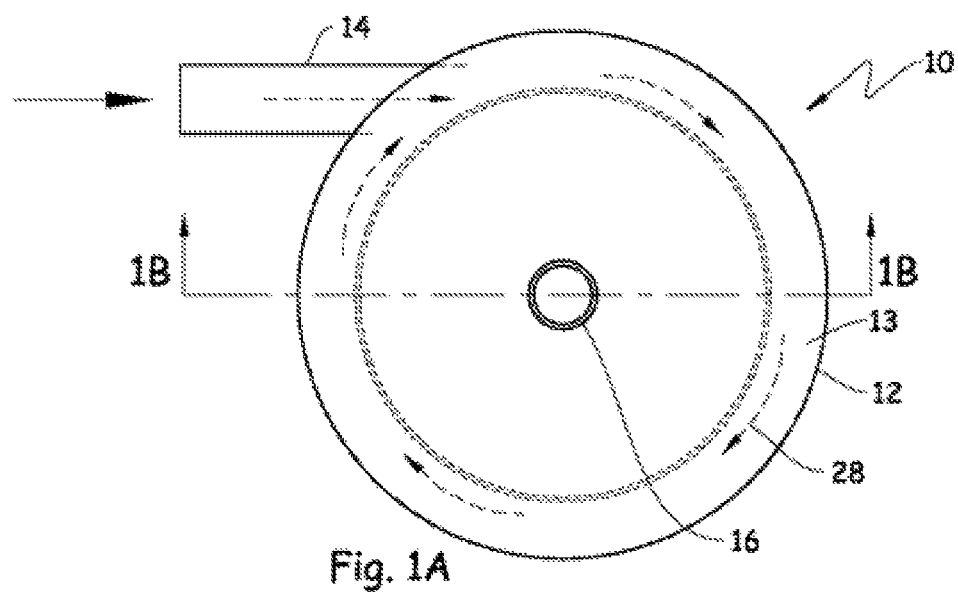
FIG. 1A is an elevational view showing one embodiment of the invention.
Figure 1B:
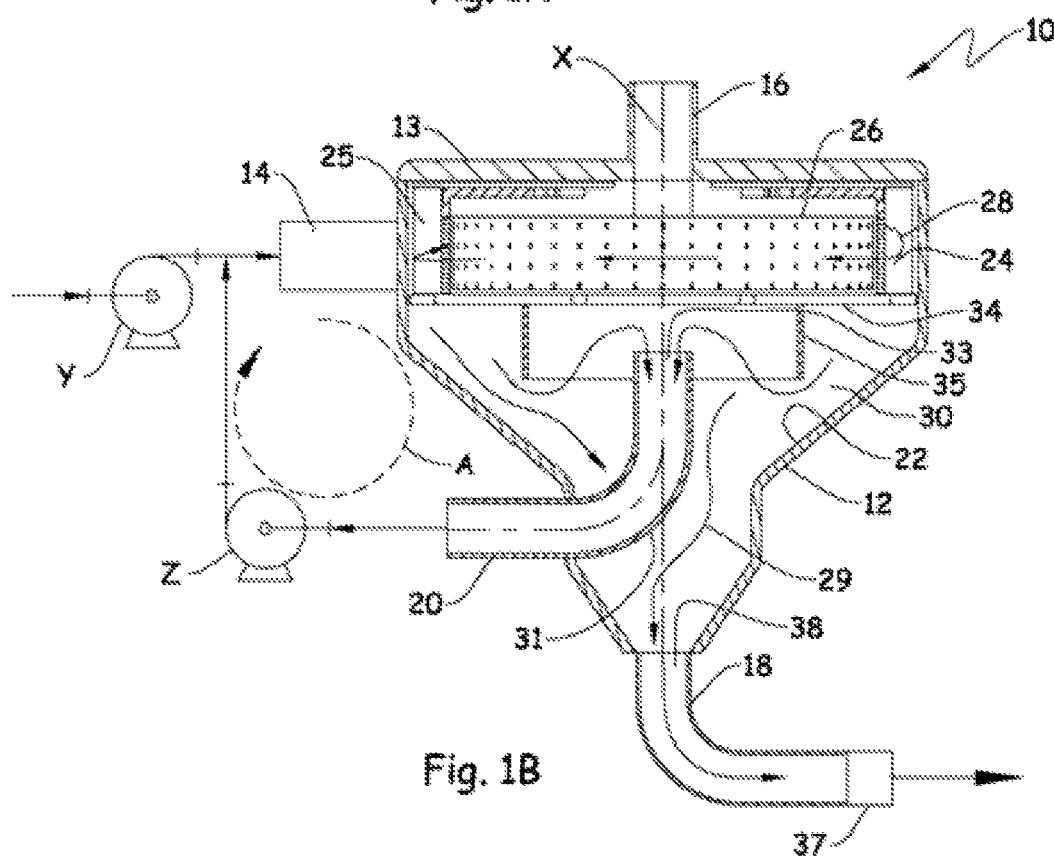
FIG. 1B is a cross-sectional view taken along lines 1B-1B of FIG. 1A.
Figure 1C:
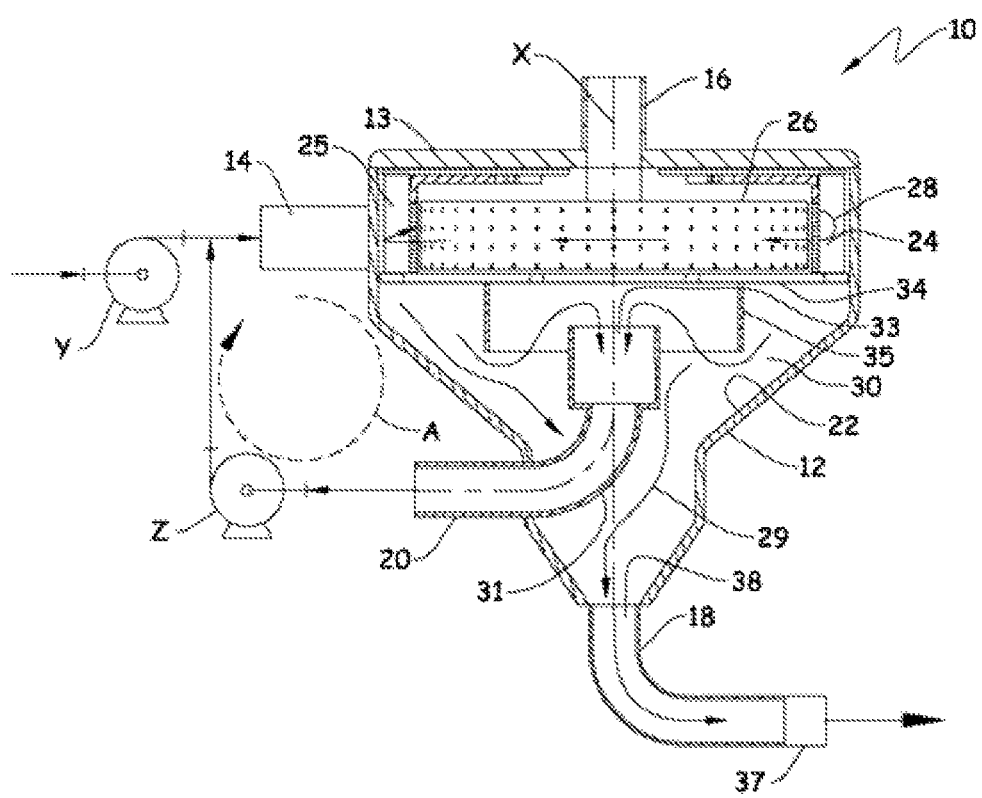
FIG. 1C is a cross-sectional view of an alternative embodiment illustrated in FIG. 1B.
Figure 1D:
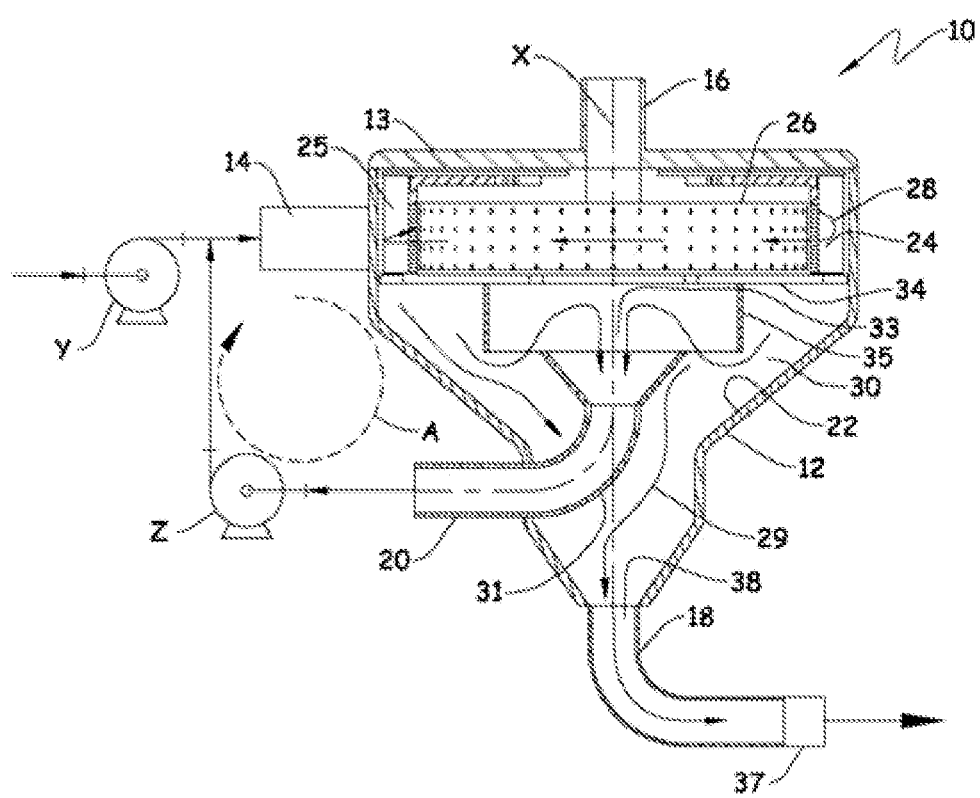
FIG. 1D is a cross-sectional view of an alternative embodiment illustrated in FIG. 1B.
Figure 2:
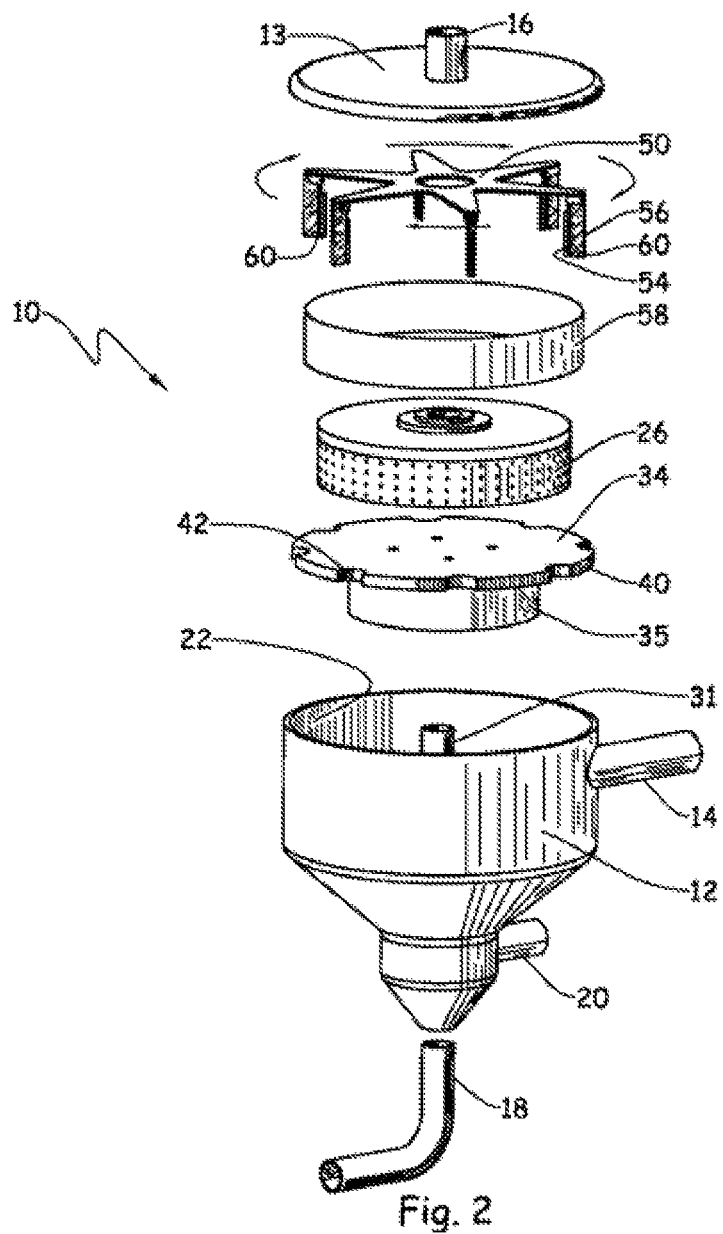
FIG. 2 is an exploded perspective view of the embodiment illustrated in FIGS. 1A and B.

One embodiment of the invention is illustrated in FIGS. 1 and 2 including a hydroclone generally shown at 10 including a tank (12) having a removable lid (13), a fluid inlet (14), a filtered fluid outlet (16), an effluent outlet (18), a process fluid outlet (20) and an inner peripheral wall (22) positioned about an axis (X) and enclosing a plurality of aligned chambers. While depicted as including two chambers, i.e. a vortex chamber (24) and an effluent separation chamber (30), additional chambers may also be included. Similarly, additional fluid inlets and outlets may also be included. While shown as having a cylindrical upper section and a frustro-conical base, the tank (12) may have other configurations including a purely cylindrical shape. While shown as being vertically aligned along a central axis (X), the vortex and effluent separation chambers may be sequentially aligned along an alternative axis, e.g. along a horizontal axis.

A filter assembly (26) is preferably centrally located within the chamber (24) and is evenly spaced from the inner peripheral wall (22) of the tank (12). As best shown in FIG. 3A, the filter assembly (26) includes a cylindrical outer membrane surface (44) symmetrically located about the axis (X) and encloses a filtrate chamber (46) that is in fluid communication with the filtered fluid outlet (16). While shown as being shaped as a cylinder, other configurations may be used including stepped and conical shaped filters. The filter assembly (26) includes an outer membrane surface (44) which may be fabricated from a wide variety of materials including porous polymers, ceramics and metals. In one embodiment, the membrane is relatively thin, e.g. from 0.2-0.4 mm and is supported by an underlying rigid frame or porous support (not shown). A representative example is described in US2012/0010063. The pore size (e.g. 1 to 500 micron), shape (e.g. V-shape, cylindrical, slotted) and uniformity of the membrane (44) may vary depending upon application. In many preferred embodiments, the membrane (44) comprises a corrosion-resistant metal (e.g. electroformed nickel screen) including uniform sized pores having sizes from 10 to 100 microns. Representative examples of such materials are described: U.S. Pat. No. 7,632,416, U.S. Pat. No. 7,896,169, US2011/0120959, US 2011/0220586 and US2012/0010063.

As best shown in FIG. 1B, a fluid treatment pathway (28) extends from the fluid inlet (14) and defines a vortex region (25) between the inner peripheral wall (22) of the chamber (24) and the membrane surface (44). The fluid treatment pathway (28) continues through the effluent separation chamber (30) to the process fluid outlet (20).

The subject hydroclone (10) may further include a cleaning assembly (50) for removing debris from the membrane surface (44) of the filter assembly (26). A representative embodiment is illustrated in FIG. 3B wherein the assembly (50) is concentrically located and rotatably engaged about the membrane surface (44) and includes one or more spokes (52) extending radially outward. A brush (54) extends downward from the end of the spoke (52) and engages (e.g. touches or comes very near to) the surface of the membrane substrate (44). While shown as a brush (54), alternative cleaning means may be included including wipers, squeegees or scrappers. From 2 to 50 brushes, and preferably from 18 to 24 brushes are used in most embodiments. As represented by curved arrows, the cleaning assembly (50) rotates about filter assembly (26) such that the brush (54) sweeps the surface of the membrane substrate (54) and removes debris, e.g. by creating turbulence near the surface or by directly contacting the surface. One or more paddles (56) may be mounted at the end of at least one spoke (52) such that fluid flowing into the vortex chamber (24) rotates the cleaning assembly (50) about the filter assembly (26). Spacing paddles (56) evenly about the filter assembly adds stability to the rotating movement of the cleaning assembly (50) and may help maintain vortex fluid flow in the vortex chamber (24). While shown as extending radially outward from the surface of the membrane substrate (44), the paddles may be slanted, (e.g. from −5° to −30° or 5° to 30° from the radial axis) to increase rotational velocity. Bearings may be used between the filter and cleaning assemblies (26, 50) to further facilitate rotation without impeding vortex fluid flow. In alternative embodiments not shown, the cleaning assembly (50) may be driven by alternative means, e.g. electronic motor, magnetic force, etc. In yet another embodiment, the filter assembly may move relative to a fixed cleaning assembly.

The feed fluid inlet pressure and spacing between the outer periphery of the filter assembly (26) and the inner peripheral wall (22) of the tank (12) can be optimized to create and maintain a vortex fluid flow within the chamber (24). In order to further facilitate the creation and maintenance of vortex fluid flow, the fluid inlet (14) preferably directs incoming feed fluid on a tangential path about the vortex chamber, as indicated in FIG. 1A. Even following such a tangential path, pressurized feed fluid may directly impinge upon the membrane surface (44) of the filtration assembly (26) and lead to premature wear or fouling—particularly in connection with feed fluids having high solids content. To protect the membrane surface (44), an inlet flow shield (58) may be located between the fluid inlet (14) and the membrane surface (44), e.g. concentrically located about the filter assembly (26). Non-limiting embodiments are illustrated in FIGS. 2 and 3C. As shown, the shield (58) preferably comprises a non-porous cylindrical band of material, e.g. plastic, which blocks at least a portion of fluid flowing into the chamber (24) from the fluid inlet (14) from directly impinging upon (impacting) the membrane surface (44). The band may be formed from a continuous loop of material or by way of independent arcs. In a preferred embodiment, the shield (58) has a height approximating the height of the membrane surface (44) such that the shield (58) and membrane surface (44) forms concentric cylinders. In a preferred embodiment, the shield may be removably mounted to the cleaning assembly (50). By way of a non-limiting example, the paddles (56) of the cleaning assembly (50) may include vertical slots (60) for receiving the shield (58).

Figure 4A:
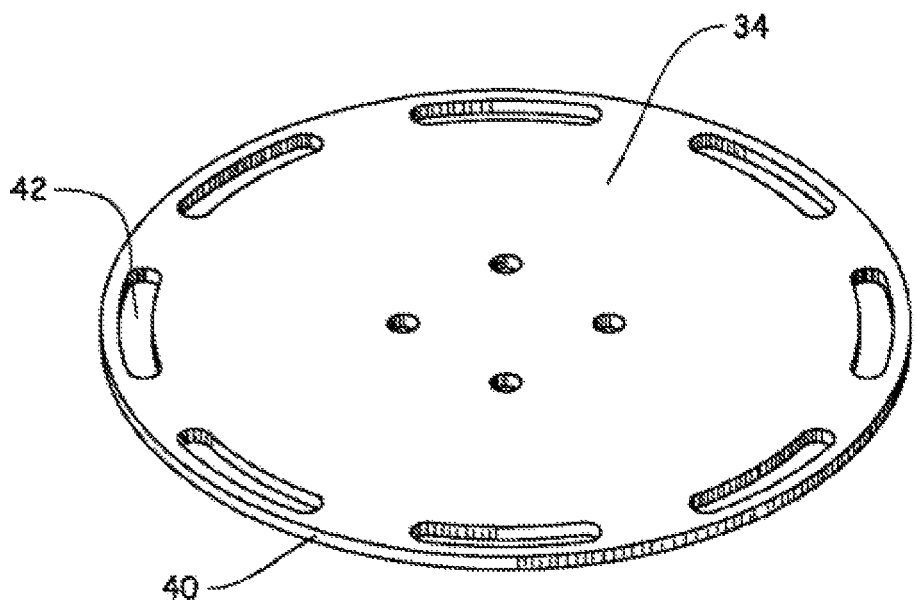
FIG. 4A is a perspective view of one embodiment of a vortex flow barrier.
Figure 4B:
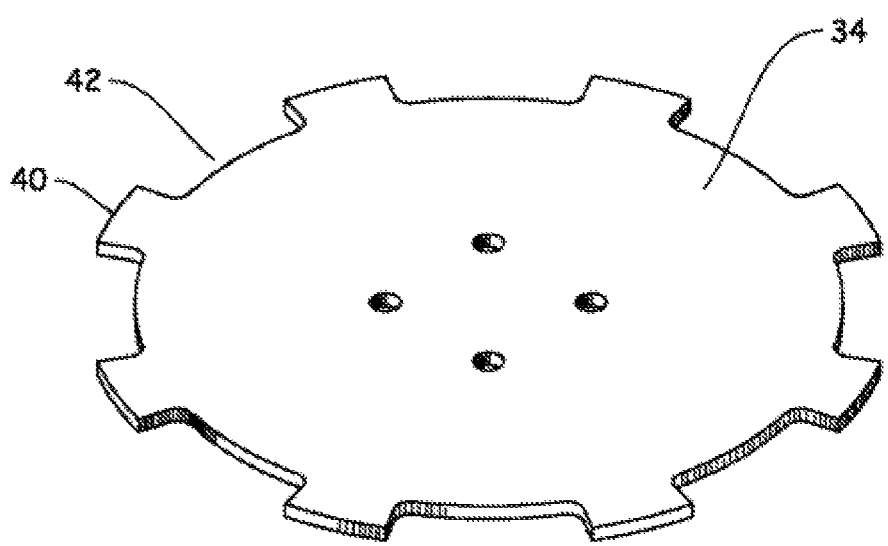
FIG. 4B is a perspective view of an alternative embodiment of a vortex flow barrier.

A vortex flow barrier (34) is preferably located between the vortex and effluent separation chambers (24, 30). The vortex flow barrier (34) is designed to maintain vortex fluid flow in the vortex chamber (24), disrupt the vortex as fluid flows from the vortex chamber (24) into the effluent separation chamber (30), and reduce the rotational fluid flow within the effluent separation chamber (30). The vortex flow barrier (24) accomplishes this by directing fluid flow between the vortex and effluent separation (24, 30) chambers to locations adjacent to the inner peripheral wall (22) of the tank (12). In a preferred embodiment illustrated in FIG. 1B, the vortex flow barrier (34) includes an outer periphery (40) extending to locations adjacent to (e.g. within 50 mm, 25 mm or even 10 mm) or in contact with the inner peripheral wall (22) of the tank (12) and may optionally include a plurality of apertures (42) located near the periphery (40) and extending therethrough. The size and shape of apertures (42) is not particularly limited, e.g. scalloped-shaped, slots, elliptical, etc. A few representative examples are illustrated in FIG. 4A-B. In yet other non-illustrated embodiment, the vortex flow barrier (34) may include an outer periphery that includes no apertures and extends to locations adjacent to (e.g. within 50 mm, 25 mm or even 10 mm) the inner peripheral wall (22) of the tank (12). The vortex flow barrier (34) is designed to control the flow of fluid through the chambers of the tank (12) with a majority (e.g. preferably at least 50%, 75%, and in some embodiments at least 90%) of volumetric flow being preferentially directed to locations near (e.g. within at least 50 mm, 25 mm or even 10 mm) the inner peripheral wall (22) of the tank (12). With that said, a minority (e.g. less than 50% and more preferably less than 75% and still more preferably less than 90%) of the fluid flow may occur at alternative locations including the center location. While the illustrated embodiments have a plate or disc configuration, the vortex flow barrier may assume other configurations including one having an angled or curved surface, e.g. cone- or bowl-shaped.

The effluent separation chamber (30) is adapted to enhance separation of particles by reducing and redirecting fluid velocity. The effluent separation chamber (30) is designed so that the bulk of the fluid moves along the fluid treatment pathway (28) through a region within the effluent separation chamber (300 where they accelerate away from the effluent outlet (18), and in this region their motion changes from moving toward the effluent outlet (18) to moving away from the effluent outlet (18). In preferred embodiments, this is at least partially accomplished by including a fluid treatment pathway (28) that follows a serpentine path from the vortex chamber (24) to the fluid outlet (20) which promotes the separation and settling of particles from the bulk fluid flow due to gravity. That is, by blocking a direct or near linear fluid pathway within the effluent separation chamber (30), solids tend to settle out of the more dynamic fluid flow, exiting the tank (12) via the process fluid outlet (20).

As illustrated in FIG. 1B, the hydroclone (10) may also include an optional conduit (31) including a process fluid inlet (33) located near the axis (X) (e.g. centrally located) within the effluent separation chamber (30) which is in fluid communication with the process fluid outlet (20). As illustrated in FIG. 1C and FIG. 1D, the process fluid inlet (33) may include a region wider than the conduit (31) at its inlet to facilitate particle collection and this wider region may be sloped as illustrated in FIG. 1D. The hydroclone (10) may further include an optional baffle (35) located about (e.g. concentrically) the inlet (33). The baffle (35) limits the amount of solids entering the inlet (33) by blocking a direct pathway. By blocking a direct or near linear fluid pathway from the vortex chamber (24), solids tend to settle out of the more dynamic fluid flow entering the inlet (33). In the embodiments of FIGS. 1B, C and D, the axis (X) is vertically aligned and the fluid inlet (33) faces vertically upward near the center of the effluent separation chamber (30). In this configuration, the fluid treatment pathway (28) follows a serpentine path from the vortex chamber (24) to the fluid outlet (20). Importantly, the path reverses course, initially flowing generally downward and then upward, and finally downward within the conduit (31). Particles within the bulk flowing along this pathway tend to be drawn downward to the effluent outlet (18) and are unable to reverse flow direction due to gravitational forces. While not illustrated, alternative arrangements may also be used wherein the inlet (33) faces downward and a baffle extends upward from the bottom of the effluent separation chamber (30) and concentrically about the inlet (33). The use of an optional baffle (35) enhances the separation. While the baffle (35) is shown as having a cylindrical structure, other structures which block a direct pathway may also be used.

In operation, pressurized feed fluid (e.g. preferably from 4 to 120 psi) enters the tank (12) via the fluid inlet (14) and follows along fluid treatment pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the filter assembly (26) into a filtrate chamber (46) and may subsequently exit the tank (12) as "filtrate" by way of the filtered fluid outlet (16). The remaining "non-filtrate" flows from the vortex chamber (24) to the effluent separation chamber (30). The vortex flow barrier (34) directs the majority (e.g. preferably at least 50%, 75%, and in some embodiments at least 90%) of such volumetric flow to locations along or adjacent (e.g. within at least 50 mm, 25 mm or even 10 mm) to an inner peripheral wall (22) of the tank (12). This arrangement is believed to maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the center of the effluent separation chamber (30), enter into the effluent opening (38) and may then exit the tank by way of effluent outlet (18). The effluent outlet (18) may optionally include a valve (37) (e.g. one-way check value or pump) to selectively control removal of effluent from the tank (12). The remaining liquid (hereinafter referred to as "process fluid") in the effluent separation chamber (30) flows out of the tank (12) by way of the process fluid outlet (20). In most applications, process fluid represents a mid-grade product that may be re-used, disposed of, or recycled back to the fluid inlet (14) for further treatment. "Filtrate" typically represents a high grade product that may be re-used or disposed of. "Effluent" represents a low grade product that may be further treated or disposed of. However, it should be appreciated that in some applications, effluent may represent a valuable product.

In another embodiment, the subject hydroclone (10) forms part of a separation system that includes a feed pump (Y) in fluid communication with the fluid inlet (14) that is adapted for introducing a liquid mixture (feed) into the fluid inlet (14) and a recirculation pump (Z) in fluid communication with the process fluid outlet (20) and fluid inlet (14). The recirculation pump (Z) is adapted for introducing process liquid from the process fluid outlet (20) to the fluid inlet (14). The recirculation pump (Z) along with the process fluid outlet (20), fluid inlet (14) and fluid treatment pathway (28) collectively define a recirculation loop (A).

The use of both a feed pump (Y) and recirculation pump (Z) provide improved efficiencies over single pump designs allowing economical operation when multiple passes through the recirculation loop are used to remove particles. When each pass through the effluent separation chamber (30) has relatively low recovery of particles, several passes through the system are needed on average to remove each particle. Within the vortex chamber (24), pressure must exceed the trans-membrane pressure, and uniform flux along the fluid treatment path (28) is more readily attained when systems are designed for a higher trans-membrane pressure. Since pressure drops associated with each pass are cumulative, a system designed around a single pump can have substantial efficiency losses through re-pressurization of each pass. By contrast, if a feed pump (Y) is used to provide a pressurized liquid to a pressurized recirculation loop driven by a second pump (Z), the energy losses on successive passes associated with re-pressurizing to a trans-membrane pressure and any filtrate back-pressure are avoided. The recirculation pump (Z) needs only to supply energy to drive fluid through the recirculation loop, and, in some embodiments, create relative motion between the membrane surface (44) and cleaning assembly (50). In a preferred embodiment, the recirculation pump (Z) is adapted for introducing a volume of process liquid into the fluid inlet (14) that is at least twice, more preferably three times, the volume of feed liquid introduced by the feed pump (Y). While not shown, the system (10) may include additional pumps and corresponding valves for facilitating movement of liquids and solids.

The subject hydroclones provide superior separation efficiencies as compared with previous designs. These efficiencies allow the hydroclone to be used in a broader range of applications; particular in embodiments where process fluid is recycled and optionally blended with make-up feed fluid. Broadly stated, feed fluid is subjected to a synergistic combination of multiple separation processes within a single device. Specifically, feed fluid is subject to cyclonic separation based at least partially upon density with denser material (e.g. particles, liquids) being urged toward the inner periphery of the tank. Fluid passing through the filter assembly is additionally subjected to cross-flow filtration. The subject inlet feed shield prevents the membrane used in cross-flow filtration from being subject to excessive wear or fouling attributed to the feed pressures and feed content associated with cyclonic separations. The entire subject matter of each of the US patents mentioned herein references are fully incorporated by reference.

The invention claimed is:

1. A hydroclone (10) comprising a tank (12) including a fluid inlet (14), a filtered fluid outlet (16), an effluent outlet (18), a process fluid outlet (20) and an inner peripheral wall (22) positioned about an axis (X) and enclosing a plurality of axially aligned chambers comprising:

i) a vortex chamber (24) in fluid communication with the fluid inlet (14), a filter assembly (26) comprising an outer membrane surface (44) symmetrically located about the axis (X) within the vortex chamber (24) and enclosing a filtrate chamber (46) in fluid communication with the filtered fluid outlet (16), a fluid treatment pathway (28) extending from the fluid inlet (14) and about the filter assembly (26) which is adapted to generate a vortex fluid flow about the filter assembly (26), wherein the filtrate chamber (46) is in fluid communication with the filtered fluid outlet (16) such that fluid passing through the filter assembly (26) enters the filtrate chamber (46) and may exit the tank (12) by way of the filtered fluid outlet (16), and ii) an effluent separation chamber (30) adapted for receiving unfiltered fluid from the vortex chamber (24), wherein the effluent separation chamber (30) is in fluid communication with the effluent outlet (18), a conduit (31) located in the effluent separation chamber (30) and extending from an inlet (33) located near the axis (X) to the process fluid outlet (20) located in the effluent separation chamber (30) and a baffle (35) concentrically located about the inlet (33) that blocks a linear fluid pathway into the inlet (33), wherein the hydroclone (10) further comprises a vortex flow barrier (34) located between the vortex and effluent separation chambers (24, 30) which is adapted to disrupt vortex fluid flow as fluid flows from the vortex chamber (24) to the effluent separation chamber (30) and direct a majority of fluid flow between the vortex and effluent separation (24, 30) chambers to locations adjacent to the inner peripheral wall (22) of the tank (12).

2. The hydroclone (10) of claim 1 wherein the vortex flow barrier (34) comprises an outer periphery (40) extending to locations adjacent to the inner peripheral wall (22) of the tank (12), and further comprises a plurality of apertures (42) extending therethrough.

3. The hydroclone (10) of claim 1 wherein the vortex flow barrier (34) comprises an outer periphery (40) extending to locations within at least 50 mm of the inner peripheral wall (22) of the tank (12).

4. The hydroclone (10) of claim 1 wherein the vortex flow barrier (34) comprises a disc shaped configuration.

5. The hydroclone (10) of claim 1 further comprising a cleaning assembly (50) that is concentrically located and rotatably engaged about the membrane surface (44).

6. The hydroclone (10) of claim 1 further comprising a recirculation pump (Z) in fluid communication with the process fluid outlet (20) and fluid inlet (14).

* * * * *